United States Patent
Schulze

(10) Patent No.: US 11,028,922 B2
(45) Date of Patent: Jun. 8, 2021

(54) PARKING LOCK FOR A VEHICLE TRANSMISSION

(71) Applicant: KOKI TECHNIK Transmission Systems GmbH, Niederwürschnitz (DE)

(72) Inventor: Bernd Schulze, Niederdorf (DE)

(73) Assignee: KOKI TECHNIK Transmission Systems GmbH, Niederwürschnitz (DE)

( * ) Notice: Subject to any disclaimer, the term of this patent is extended or adjusted under 35 U.S.C. 154(b) by 55 days.

(21) Appl. No.: 16/267,422

(22) Filed: Feb. 5, 2019

(65) Prior Publication Data

US 2019/0242477 A1    Aug. 8, 2019

(30) Foreign Application Priority Data

Feb. 5, 2018 (DE) ...................... 10 2018 102 474.6

(51) Int. Cl.
| | | |
|---|---|---|
| *F16H 63/34* | (2006.01) | |
| *B60T 1/00* | (2006.01) | |
| *F16D 63/00* | (2006.01) | |
| *B60T 1/06* | (2006.01) | |

(52) U.S. Cl.
CPC .......... *F16H 63/3425* (2013.01); *B60T 1/005* (2013.01); *B60T 1/062* (2013.01); *F16D 63/006* (2013.01)

(58) Field of Classification Search
CPC ...... F16H 63/3425; F16H 63/34; B60T 1/005; B60T 1/062; F16D 63/006
See application file for complete search history.

(56) References Cited

U.S. PATENT DOCUMENTS 5,269,195 A * 12/1993 Kitagawara ............. B60T 1/005
                                                      188/69
5,807,205 A * 9/1998 Odaka ....................... B60L 7/00
                                                      477/20

FOREIGN PATENT DOCUMENTS

| DE | 19535239 C1 | 12/1996 |
| DE | 10143386 A1 | 4/2003 |
| DE | 102009030005 A1 | 12/2010 |
| DE | 102013204174 A1 | 9/2014 |

OTHER PUBLICATIONS

German office action for patent application No. 10 2018 102 474.6 dated Oct. 19, 2018.

* cited by examiner

*Primary Examiner* — Huan Le

(74) *Attorney, Agent, or Firm* — Bachman & LaPointe, PC

(57) ABSTRACT

The invention concerns a parking lock of a motor vehicle transmission with a ratchet wheel (1) and a ratchet (2), wherein the ratchet wheel (1) and the ratchet (2) consist of plastic, the ratchet (2) having a first ratchet tooth (6) and a further ratchet tooth (7), and the ratchet wheel (1) having a first tooth receiver (12) and a further tooth receiver (13), the first ratchet tooth (6) being hookable into the first tooth receiver (12) and the further ratchet tooth (7) being hookable into the further tooth receiver (13).

13 Claims, 1 Drawing Sheet

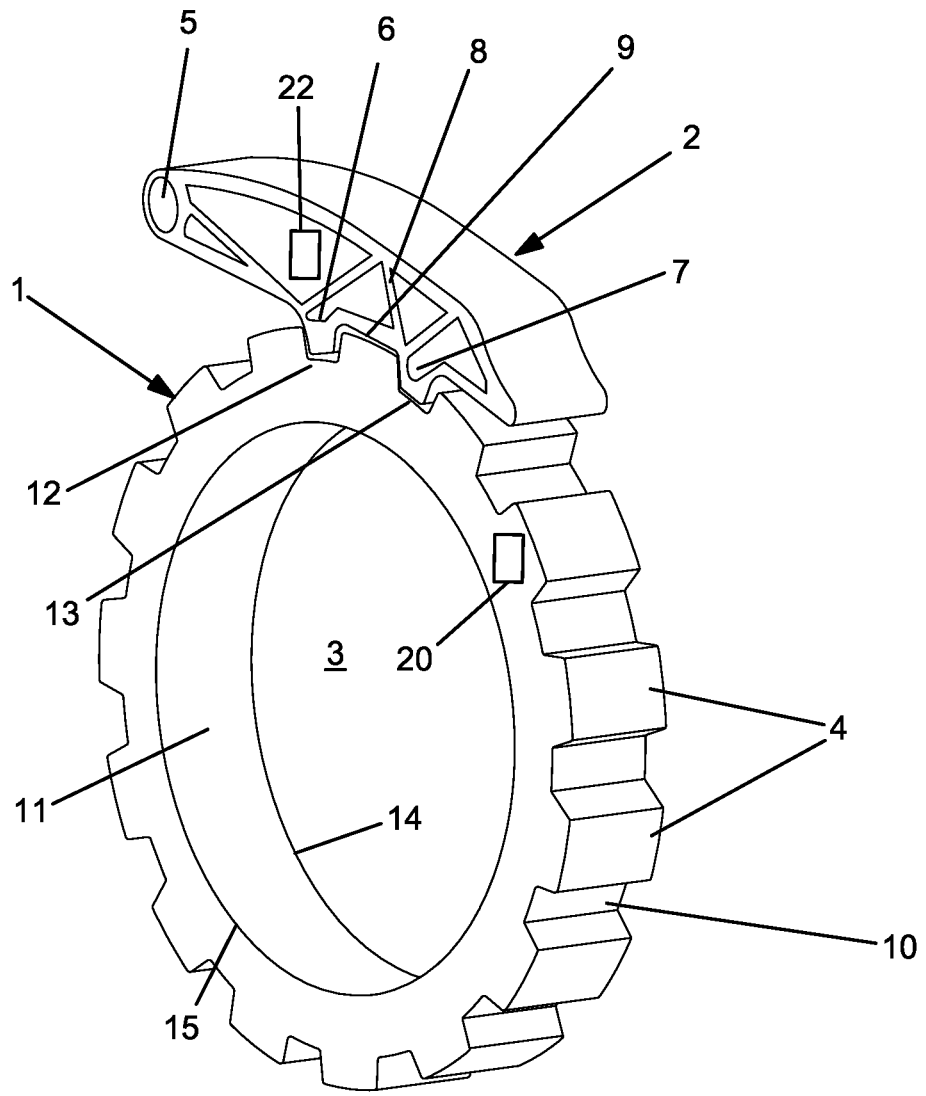

PARKING LOCK FOR A VEHICLE TRANSMISSION

TECHNICAL FIELD

The invention concerns a parking lock for a vehicle transmission.

STATE OF THE ART

Parking locks of this kind are already known and used in a variety of forms and designs.

In WO 2006/058571 A1, for example, a metal pawl for a motor vehicle gearbox is revealed, in which the parking lock is intercepted by a hydraulic damping element when it is unhooked.

Reference is also made to DE 10 2009 030 005 A1, which reveals a metal pawl with up to three locking elements.

Finally, reference is made to DE 10 2013 204 174 A1. There a pawl wheel is revealed, whereby the pawl wheel consists of three rings, whereby the middle ring can be made of plastic.

State-of-the-art ratchet wheels and pawls are made of steel materials to withstand the high loads in various load cases when ensuring the ratchet function. The manufacture of rackets and ratchet wheels currently requires complex mechanical processing.

Another disadvantage of state-of-the-art technology is that conventional ratchet wheels and ratchets are too heavy. Another disadvantage is that, as mentioned above, a high manufacturing effort is necessary to ensure that the internal and external teeth of the ratchet wheel function properly. The same applies to the tooth geometry of the ratchet.

SUMMARY OF THE INVENTION

The task of this invention is to overcome the disadvantages arising from the state of the art. In particular, a parking lock is to be provided for a motor vehicle transmission, which is to enable as low a weight as possible with as little manufacturing effort as possible. At the same time, the integration of sensors in the body of the ratchet and the ratchet wheel is planned in order to monitor the position and the load behaviour of both components.

The characteristics disclosed herein lead to the solution of the task.
Advantageous Designs are Described Herein and in the Subclaims.

A parking lock according to the invention is intended for use in a vehicle transmission. Passenger cars and trucks can be considered as vehicle transmissions. The parking lock consists primarily of a ratchet wheel and a ratchet. In particular, the ratchet wheel and ratchet are made of plastic.

The plastic can be a thermoplastic and/or a thermosetting plastic. The plastic can be reinforced with carbon, glass, mineral or ceramic fibres. In this combination, the plastic can also be additionally reinforced by a plastic insert, whereby the plastic insert can be provided with a scrim or fabric made of long fibres. The use of prepregs and/or organic sheets for component reinforcement is also possible as an option.

The advantage here is that the ratchet and the ratchet wheel can be manufactured without mechanical reworking. For example, the ratchet wheel can be connected to a gear shaft by means of an injection process. This eliminates the need for time-consuming work to produce plug connections for the ratchet wheel in accordance with the state of the art or for welded connections for the ratchet wheel. The heat input associated with welding and the adverse effects on component tolerances are also advantageously avoided.

Furthermore, the parking lock according to the invention has the ratchet with a first ratchet tooth and a further ratchet tooth, whereby the ratchet wheel has a first tooth receiver and a further tooth receiver, whereby the first ratchet tooth can be hooked into the first tooth receiver and the further ratchet tooth can be hooked into the further tooth receiver.

As long as the ratchet wheel can rotate freely and the ratchet teeth are not hooked into the tooth holders, the parking lock is in its resting position. As soon as the locking teeth are hooked into the tooth holders, the parking lock is in the working position according to the definition of this invention.

In addition, the ratchet wheel has a plurality of teeth on an outer radial surface of the ratchet wheel and thus represents a kind of gear wheel. The free spaces between the teeth of the ratchet wheel serve as a lock for the ratchet in the working position. The teeth of the ratchet wheel are designed geometrically so that the ratchet can engage with the first ratchet tooth and the further ratchet tooth at a correspondingly low speed of the ratchet wheel. In the working position, the teeth of the ratchet are supported by the teeth of the ratchet wheel and thus realize a mechanical locking of the gear output shaft, e.g. on the gear housing.

The ratchet wheel has a receiving opening. In a preferred design example, the receiving opening is circular and serves, for example, to accommodate a shaft, in particular a gear output shaft. The ratchet wheel should be rotationally fixed, i.e. it should be able to be connected to the shaft in rotation.

The ratchet wheel also has a ratchet wheel inner surface, with the ratchet wheel inner surface tapered towards the receiving opening. This sharpening can take the form of a taper or a reduction in the circumference of the ratchet inner surface. The advantage here is that a torsion-proof connection between the ratchet wheel and the shaft is achieved without the need for additional joining, e.g. a welded connection or a complex plug-in connection. The shaft can also be added at the connection point for the purpose of a torque-proof connection between ratchet wheel and shaft.

The ratchet has an intermediate space between the first ratchet tooth and the further ratchet tooth, whereby the intermediate space accommodates the ratchet wheel tooth in the working position. The ratchet can also be designed as a multiple ratchet in the same way as DE 10 2009 030 005 A1.

The ratchet also has a through-handle. The through-handle serves to accommodate a swivel shaft, via which the ratchet can be swivelled from the rest position into the working position and back again. In a design example, the through-handle is arranged at the end of the ratchet in order to enable the ratchet to swivel as far as possible.

The ratchet also has serrated and/or continuous reinforcing ribs on one or both sides. The reinforcing ribs serve to reinforce the ratchet at the necessary points to absorb peak forces in its working position.

The ratchet wheel includes a first sensor schematically illustrated in the drawing at 20. The ratchet includes a second sensor schematically illustrated in the drawing at 22. The two sensors are used to detect the position of the respective individual component as well as the individual components in relation to each other. The sensors can also be used, for example, to record the temperature and tensile and compressive loads of the respective component and transmit them to a computer. This is possible in a simple way due to the plastic construction.

BRIEF DESCRIPTION OF THE DRAWINGS

Further advantages, characteristics and details of the invention result from the following description of preferred design examples as well as from the drawing, which shows in its only FIGURE a schematic representation of a design example of a parking lock for a vehicle transmission according to the invention.

DETAILED DESCRIPTION

The FIGURE shows a ratchet wheel 1. The ratchet wheel 1 is ring-shaped and has a receiving opening 3 in the interior. Furthermore a ratchet 2 is shown, which is shown in working position to the ratchet wheel 1. The ratchet 2 has a slightly curved shape, which allows the ratchet 2 to cling to the ratchet wheel 1 in the working position.

In the working position, a first ratchet tooth 6 of ratchet 2 meshes with a first tooth holder 12 of ratchet wheel 1. In the working position it is also shown how a further ratchet tooth 7 of the ratchet 2 is hooked into the further tooth holder 13 of the ratchet wheel 1.

In the same way a tooth 4 of ratchet wheel 1 engages in a space 9 of ratchet 2. The tooth 4 is formed between the first tooth receiver 12 and the further tooth receiver 13 and projects radially away from the ratchet wheel 1. Inner surface 11 tapers from a first end 15 toward a second end 14. Thus, the inner circumference of the inner surface 11 is larger at the first end 15 than at the second end 19.

Tooth 4 and the tooth receivers 12, 13 form a ratchet wheel outer surface 10 in alternating arrangement. A side of the ratchet wheel 1 facing the receiving opening 3 represents a ratchet wheel inner surface 11.

Furthermore, a through handle 5 is shown at the end of the ratchet 2.

Finally, a reinforcing rib 8 can be seen, which is formed in a serrated shape as part of the ratchet 2.

Although only one preferred example of the execution of the invention has been described and presented, it is obvious that the skilled person can add numerous modifications without leaving the essence and scope of the invention.

LIST OF ITEM NUMBERS

1. Ratchet wheel
2. Ratchet
3. Receiving opening
4. Tooth
5. Through-Handle
6. First ratchet tooth
7. Further ratchet tooth
8. Reinforcing rib
9. Space
10. Ratchet wheel outer surface
11. Inner surface of ratchet wheel
12. First tooth receiver
13. Further tooth receiver
14. second end
15. first end

The invention claimed is:

1. A parking lock for a vehicle transmission comprising a ratchet wheel (1) and a ratchet (2),
    wherein
    the ratchet wheel (1) and the ratchet (2) consist of plastic, the ratchet (2) having a first ratchet tooth (6) and a further ratchet tooth (7), and the ratchet wheel (1) having a first tooth receiver (12) and a further tooth receiver (13), the first ratchet tooth (6) being hookable into the first tooth receiver (12) and the further ratchet tooth (7) being hookable into the further tooth receiver (13), wherein the ratchet (2) has reinforcing ribs (8).

2. Parking lock according to claim 1, wherein the ratchet wheel (1) has, formed on a ratchet wheel outer surface (10), a tooth (4) between the first ratchet tooth (6) and the further ratchet tooth (7).

3. Parking lock according to claim 2 wherein the ratchet (2) has an intermediate space (9) between the first ratchet tooth (6) and the further ratchet tooth (7).

4. Parking lock according to claim 3, wherein the intermediate space (9) receives the tooth (4) in the working position.

5. Parking lock according to claim 1 wherein the ratchet wheel (1) is provided with a receiving opening (3) for a shaft.

6. Parking lock according to claim 1 wherein the ratchet wheel (1) has a ratchet wheel inner surface (11).

7. Parking lock according to claim 6, wherein the ratchet wheel inner surface (11) tapers from a first end (15) toward a second end (14) to reduce a circumference of a receiving opening (3) of the ratchet wheel (1).

8. Parking lock according to claim 1 wherein the ratchet (2) has a through-handle (5).

9. Parking lock according to claim 1 wherein the ratchet wheel (1) comprises a first sensor.

10. Parking lock according to claim 1 wherein the ratchet (2) comprises a second sensor.

11. Parking lock according to claim 1 wherein the plastic is a thermoplastic or a thermosetting plastic or aluminium.

12. Parking lock according to claim 1 wherein the plastic is reinforced by carbon, glass, mineral or ceramic fibres.

13. Parking lock according to claim 1 wherein the plastic is reinforced by a plastic insert, the plastic insert being provided with a scrim or fabric of long fibres.

* * * * *